Patented Mar. 15, 1932

1,849,989

UNITED STATES PATENT OFFICE

HARRY C. MOORE, OF CHICAGO, ILLINOIS, ASSIGNOR TO ARMOUR FERTILIZER WORKS, OF CHICAGO, ILLINOIS, A CORPORATION OF NEW JERSEY

MANUFACTURE OF MIXED FERTILIZERS

No Drawing.     Application filed May 2, 1929. Serial No. 360,001.

The present invention relates to improved, mixed fertilizers and their methods of manufacture, its principal objects being an improved physical condition of the fertilizer, permitting ease of proper apportionment in the soil, a more uniform distribution of the fertilizer ingredients throughout the mixture, the maintenance of the total plant food in the fertilizer constituents practically unimpaired from the standpoints of quantity and availability, a decrease in the curing or drying period, an improvement in the odor of the product, a reduction in the cost of production, and the making of a complete fertilizer with practically no free acid and which does not detrimentally affect the bags in which the product is packed and sold, thereby precluding any necessity for treating the bags against disintegration.

According to the present practice of making mixed fertilizers, definite amounts of a phosphate, such as acid phosphate or superphosphate, or the like, and nitrogen-containing and potash-bearing ingredients, are mechanically mixed, the acid phosphate invariably containing both free and water soluble phosphoric acid ($P_2O_5$), with the result that oftentimes free volatile acids are liberated from other constituents of the mixture, causing sometimes loss of oxides of nitrogen, or of free nitrogen, or both, the development of acrid or pungent odors, and, under some circumstances, the free acidity causes disintegration of the bags containing the fertilizer.

To forestall these detrimental actions, it has heretofore been usual, unless a considerable quantity of some bulky organic material, such as tankage, was present, to add to the mixture a solid, alkaline substance, such as cyanamid, slacked lime, or even limestone, but this procedure, however, is not wholly satisfactory, because the reaction is slow, and the distribution of such solid alkali, in the small quantity it is usually advisable to use, is not complete, and not uniform enough to prevent entirely the objectionable effects of the free acid.

Such a fertilizer must ordinarily be cured over a substantial period of time in order to obtain a reasonably good physical state suitable for the trade.

If the quantity of such introduced solid alkali be increased, in an attempt to lessen the curing time and effect a more complete neutralization of the free acid, several detrimental results accrue, for example, appreciably more of the available phosphoric acid reverts to an unavailable form, and, further, the heat generated, due to the reaction caused by the presence of such alkali, accelerates the action of the remaining free acid present on any nitrate and ammonium sulphate, resulting in a loss of nitrogen, either as oxide of nitrogen or as free nitrogen, or both. While it is true that such an increase in the amount of such solid alkali added would seemingly neutralize all free acid present, that is not the case, due to the fact that a solid alkali will not completely neutralize the free acidity of solid particles by reason of incomplete contact of the particles with one another, and, in the presence of more than enough solid alkali, such as lime or cyanamid, to neutralize all of the free acid, free nitrogen may be lost from a mixture of a phosphate containing free acid, a nitrate and ammonium sulphate.

According to other processes, crude phosphoric acid has been neutralized with ammonia to form an ammonium phosphate, which is recovered from the solution by evaporation and which may be used as a fertilizer either alone or mixed with other fertilizer ingredients.

Gas-house liquor has also been mixed with boiling phosphoric acid solution to form an ammonium phosphate which is recovered on evaporation.

There are other processes in which ammonia gas has been caused to react with superphosphates, and, during such reaction, considerable heat is developed, which heat of this exothermic reaction expels the free moisture from the product.

My novel and improved process differs in principle from all of the above-stated methods in that I mix an ammoniacal liquor or a water solution of ammonia (ammonium hydroxide solution) with the ground fertilizer ingredients, at least one of which is acidic, to overcome or neutralize the free acid condition thereby producing a quite unexpected result.

My discovery consists in the fact that, by so doing, I not only obtain a product which contains practically no free acid, but I also secure by my method certain new and unforeseen advantages which are of great commercial importance.

When operating according to my new process, although I add ammonia in a water solution to the mixture, the product which results is one that quickly cures of itself in a very short time, without the employment of external heat and without the expulsion of any considerable quantity of the water present, to a dry-to-the-touch mass, and which, after the usual disintegration, is of a free-flowing nature suitable for application to the soil in ordinary drilling machines.

In other words, even though I use ammoniacal liquor, I obtain by my process an unanticipated, good, dry-to-the-touch, physical condition of the final product, as compared to a mixed fertilizer prepared from acid phosphate, or double superphosphate, together with other fertilizer components, such as a nitrate, ammonium salt, potassium salts, etc., but without an alkaline material present, which, after such a mixing, frequently is of such a sticky or gummy character as to be undesirable for the trade unless certain dry and bulky materials (often referred to as dryers) are present.

One of the important problems of the fertilizer manufacturer is not only to initially mix carefully the several ingredients comprising his mixture, but to avoid as far as possible later segregation, which, if permitted to occur, makes the drawing of an average sample difficult or impossible and results in a product objectionably lacking in uniformity of distribution of its constituents in the soil.

Moreover, the manufacturer, under such circumstances, may be subjected to excessive penalties in State fertilizer regulatory inspection when the fertilizer may show deficiencies in one ingredient with excess of another or others, for which no fair allowance may be made by the State regulations.

The addition of aqua ammonia in the quantity which is preferably used makes an initial distinctly moist mass, a further effect of such water present being to bring into solution some other soluble fertilizer salts present, thus causing a more uniform distribution of such salts throughout the mass and their more complete reaction.

In this moist condition, the particles are largely held together mechanically and prevented from excessive segregation by the moist condition and are partially cemented together, so to speak, when the mass sets up and becomes somewhat caked during the final curing in the storage pile.

The appearance of this partially agglomerated mass differs appreciably from a similar mixture, where, for example, the superphosphate is first treated with ammonia gas or aqua ammonia, and, after allowing this product to become reasonably dry to the touch, is mixed with other materials, for example, a nitrate, ammonium sulphate, potash salts, etc. Such a combination of materials, each one being reasonably dry, is not only difficult to mix uniformly, but, even then, easily segregates afterwards. In other words, a mixture produced by this new process, which when made is moist and allowed to cure, differs considerably in uniformity of the mixture from one made from the same materials in stages whereby only fairly dry-to-the-touch ingredients are used.

My product after curing, that is becoming dry-to-the-touch and "set" or "caked" in the storage pile, is disintegrated before bagging for shipment. Such disintegrated product does not consist of the separate particles of the original materials constituting the mixture but rather the cured mass is converted by such disintegration into small bits or particles much more uniform in composition and with less tendency to segregation than would be possible by the methods heretofore used.

Heretofore, it has been the constant aim of fertilizer manufacturers to produce or to purchase a drier super-phosphate, in fact, large commercial contracts now specify that super-phosphate must not contain in excess of thirteen per cent. moisture without penalty or rejection. Also, it has been the aim to obtain the other fertilizer ingredients as dry as possible. Furthermore, when it has been necessary to use some filler or make-weight material, such as sand, a premium has been paid for dry material. The object largely in demanding dry materials is to produce a product in better, dry, physical condition.

The employment of aqua ammonia, according to the new process, has gone contrary to all precedents in the addition of water to the ingredients of a mixed fertilizer, at the same time producing a final product, without the application of external heat, which is even drier to the touch than most mixtures made from the dry materials mentioned above, and this is accomplished without any substantial water expulsion.

Moreover, the superphosphate used may be moist, containing even in excess of thirteen per cent. moisture, also the other materials used may be moist, and aqua ammonia added, preferably usually considerably in excess of the calculated amount required to just neutralize the free acid present, and still attain the desired dry-to-the-touch product of this process and even without the presence of any bulky organic (animal or vegetable) material as a conditioner.

The fact that a considerable excess of aqua ammonia, over that calculated to be required to barely fix the free acid present in the superphosphate, may be added and yet produce a mixed fertilizer which cures quickly, becoming a final, dry-to-the-touch product without substantial water evaporation and possessing the desirable qualities and advantages heretofore mentioned was most unexpected and permits the addition of a considerable amount of ammonia in a relatively cheap form, the presence of the added quantity of water thus derived from the aqua ammonia tending to increase and to promote the advantages gained enumerated herein in preventing segregation and tending to cement more closely and uniformly together all of the particles contained in the mixture.

Another unanticipated advantage from the employment of the new process is that the final, mixed fertilizer does not lose nitrogen on standing even though a nitrate is used.

In certain types of mixed fertilizers, composed of acid phosphates, nitrogenous materials, etc., there is for a time a progressive loss of nitrogen, the latter escaping largely in the form of elemental nitrogen, or otherwise, and being completely lost so far as fertilizing value is concerned. This forfeiture or waste of nitrogen is allowed or compensated for by fertilizer manufacturers by adding such excess of nitrogenous material at the time of manufacture that the mixed fertilizer will contain the desired amount of nitrogen at the time of use. My improved process avoids this dissipation of nitrogen.

Other advantages of my process are that the entire mixing operation and the reaction between the ammonia and the acidic material or materials takes place within a few minutes, and a comparatively-homogeneous, quickly-curing mass is obtained which contains practically no free acid, and, consequently, after curing and disintegrating can be packed in untreated bags, and the rise of temperature during the mixing operation is relatively small due to the high specific heat of water added as the ammonia solution. Any considerable increase of temperature in a mixed fertilizer containing acid phosphate or superphosphate is undesirable, as higher temperatures usually tend to cause detrimental reversion of available phosphate, an advantage of using aqua ammonia instead of ammonia gas being that in the latter case a higher heat of neutralization results.

Furthermore, my process offers one of the cheapest methods, under present market conditions, of supplying additional nitrogenous plant food to a mixed fertilizer.

The ammonia specified is used in my process as ammonia liquor or aqua ammonia, and the liquid may dissolve some of the fertilizer ingredients of the mass and carry them substantially uniformly throughout the mixture producing a more homogeneous product than could be otherwise obtained.

The product is rendered more granular on curing and becomes dry to the touch more quickly, probably by reason of the fact that the water enters some of the salts formed as water of crystallization.

Indeed, the water of the ammoniacal liquor causes the mixture to become moist and thereby hastens the subsequent curing or final reaction stage, due, presumably, to the fact that in the curing of mixed fertilizers, according to my novel process, new compounds or salt formations result which reactions are promoted and facilitated by the presence of the free water.

Sufficient ammonia is used so that the resulting mixture shall contain practically no free acid, usually a considerable excess over that calculated to be required to exactly neutralize the free acid being added, and not cause the reversion of any of the fertilizer constituents to unavailable forms in any substantial degree, and, at the same time, the water solubility of the phosphoric acid content of the original material or materials is largely maintained.

According to one preferred method of practising the process, the fertilizer materials, such as super-phosphate, potassium chloride or sulphate, ammonium sulphate, sodium nitrate, leunasalpter, and with or without the addition of such a bulky material as tankage, or the like, in suitable proportions, are introduced into a standard fertilizer batch mixer, and, while being commingled or intermixed therein, are subjected to a spray or stream of ammoniacal liquor of ordinary commercial strength and in such amount as to accomplish the above-stated results.

When this fertilizer batch is discharged from the mixer it is still moist, in which condition it is unsuitable for the trade, but, usually, in a very short time, varying from an hour or two to a day or two, or more, depending partly upon the ingredients employed and partly upon the manner in which the mixture is piled in storage, it cures of itself, without further treatment, to a dry-to-the-touch product soon capable of being easily disintegrated into a free-flowing material comprising the completed fertilizer of my process, which is ready for shipment, either in bulk or in untreated bags.

By my process, not only is the condition of the product improved, but a certain proportion of the nitrogen content of the fertilizer is furnished by the ammoniacal liquor, and there is practically no impairment or decrease in the fertilizer properties of the original ingredients introduced into the mixture.

Acid phosphate, if over-aciduated, may result in a product which is sticky and in poor physical condition, as well as being excessively acid, so that it is difficult to use in fertilizer mixtures, but, by employing the new process and an adequate amount of ammoniacal liquor, such otherwise undesirable acid phosphate can be used to produce a satisfactory product of proper physical character and chemical composition, and, in fact, under certain conditions, it may be economical to use over-aciduated acid phosphate in this new process, so that a larger proportion of ammoniacal liquor can be employed, since ammonia in this form is often cheaper per pound of nitrogent content than in other forms.

The substantial permanency of the uniformity of the product is promoted by reason of the fact that the fertilizer is largely prevented from segregation into parts of different physical characteristics, due, in a measure, to the chemical reaction between the ammoniacal liquor and the acidic particles, and, in part, due to the deposition of crystals on other particles of the mixture, thus causing a chemical union and mechanical interlocking of particles sufficient to render the mixture as a whole of more unvarying character, in substantial measure debarring or obviating separation into portions or sections of different physical properties.

As an example of the amounts of ingredients which may be satisfactorily employed in practising this process, the following are submitted:

1200 pounds of acid phosphate
80 " of ammonia liquor (26% $NH_3$ by weight)
120 " of nitrate of soda
300 " of ammonium sulphate
300 " of muriate of potash Of course, it will be understood that the above is only an example of one fertilizer mixture which may be made by my improved process, and it will also be appreciated that many other mixtures of widely varying compositions may be made by, and have the advantages of, my process, according to commercial needs.

By a fertilizer containing no free acid is meant one which, when tested with methyl orange indicator in a water solution of the fertilizer, shows no acid reaction, this being a common practice in the fertilizer industry.

Those skilled in this art will readily understand that the invention, as defined by the appended claims, is not necessarily limited to the precise details presented above, and that many minor or more or less radical changes may be incorporated without departure from the heart and essence of the invention and without the loss or sacrifice of any of its material benefits.

I claim:

1. The process of making a practically non-segregating mixed fertilizer, consisting in substantially uniformly mixing for a few minutes ground solid superphosphate containing free acid and water-soluble phosphate, other solid water-soluble fertilizer compound and ammoniacal liquor of such strength and in such amount as at least substantially to neutralize said free acid, to produce a moist mixture and to cause cohesion of its particles but restricted in amount to insure a product capable upon cooling of becoming dry-to-the-touch.

2. The process of making a practically non-segregating mixed fertilizer, consisting in substantially uniformly mixing for a few minutes ground solid superphosphate containing free acid and water-soluble phosphate, a fertilizer potassium salt and ammoniacal liquor of such strength and in such amount as at least substantially to neutralize said free acid, to produce a moist mixture and to cause cohesion of its particles but restricted in amount to insure a product capable upon cooling of becoming dry-to-the-touch.

3. The process of making a practically non-segregating mixed fertilizer, consisting in substantially uniformly mixing for a few minutes ground solid superphosphate containing free acid and water-soluble phosphate, a fertilizer potassium salt, a water-soluble nitrogen-bearing compound and ammoniacal liquor of such strength and in such amount as at least substantially to neutralize said free acid, to produce a moist mixture and to cause cohesion of its particles but restricted in amount to insure a product capable upon cooling of becoming dry-to-the-touch.

4. The process of making a mixed complete fertilizer, consisting in mixing approximately 1200 pounds of acid phosphate, approximately 80 pounds of ammonia liquor of about 26% $NH_3$ by weight, approximately 120 pounds of nitrate of soda, approximately 300 pounds of ammonium sulphate, and approximately 300 pounds of muriate of potash, and curing the initial moist product to secure physico-chemical fixing of sufficient of its contained water to produce a dry-to-the-touch fertilizer containing substantially no free acid and in which the fertilizer values of the original ingredients are practically maintained.

In witness whereof I have hereunto set my hand.

HARRY C. MOORE.